A. C. HARRISON, H. M. HOWE & W. W. HARRISON.
Manufacture of Sugar to form Cylinders or Disks.
No. 146,901. Patented Jan. 27, 1874.

UNITED STATES PATENT OFFICE.

ALFRED C. HARRISON, HERBERT M. HOWE, AND WILLIAM W. HARRISON, OF PHILADELPHIA, PENNSYLVANIA.

IMPROVEMENT IN THE MANUFACTURE OF SUGAR TO FORM CYLINDERS OR DISKS.

Specification forming part of Letters Patent No. 146,901, dated January 27, 1874; application filed January 17, 1874.

*To all whom it may concern:*

Figure 1:
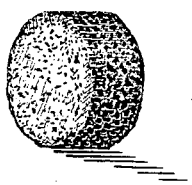

Be it known that we, ALFRED C. HARRISON, HERBERT M. HOWE, and WILLIAM W. HARRISON, of Philadelphia, Pennsylvania, have invented a Prepared Sugar for Family Use, and mode of producing the same, of which the following is a specification:

The object of our invention is to furnish, as a marketable article for family use, lump sugar in pieces of a shape which they will retain during packing, transportation, and handling, and which will be less liable to fracture than ordinary cut sugar; and this object we attain by making the pieces in the form of cylinders or disks, substantially as shown in the perspective view, Figure 1, of the accompanying drawing.

It has been a common practice to saw white sugar into cubical blocks for table use; but each block presents eight sharp corners, which are so liable to fracture during transportation, or during the act of removing a mass of the blocks from one receptacle to another, that there must necessarily be considerable waste, the broken pieces and granular particles, although available for many purposes, being a considerable loss to the consumer, who pays a higher price for cut sugar than for such as is sold in a granular condition.

Figure 2:
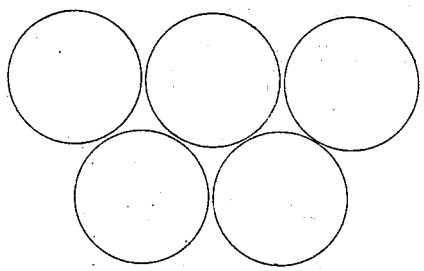
Figure 3:
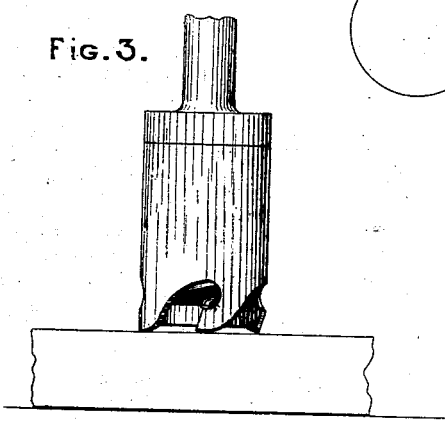
Figure 4:
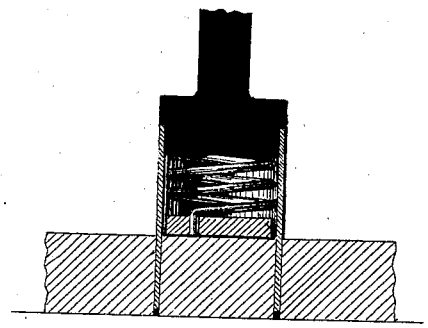

In carrying our invention into effect, we use a gang of cylindrical or barrel saws, each saw being of a character substantially as shown in Figs. 3 and 4, the saws being arranged, in respect to each other, as shown in Fig. 2. A block of white sugar is first cut into slabs of a proper thickness, and then each slab is subjected to the action of the gang of saws, by which it is formed into the desired cylindrical pieces or disks, which may be discharged from the saws by the recoil of spiral springs, in a manner which will be readily understood on referring to Fig. 4. The sugar removed by the saw-teeth, together with the pieces which intervene between the circular holes cut in the slab, are sifted by the manufacturer, so as to separate the sawdust from the intervening pieces, the former being ready for the market as extra-fine powdered sugar for confectioners' use, and the latter being ground into ordinary merchantable powdered sugar.

It will be evident that the solid cylindrical blocks or disks of sugar are less liable to be fractured and diminished in bulk by trituration than the cubical blocks, and hence that the cylinders are more economical to the consumer than the cubes.

We claim as our invention—

1. As an article of manufacture and commerce, the within-described cylindrical blocks or disks of white sugar.

2. The process described of forming slabs of white sugar into cylindrical blocks or disks, for the purpose specified.

In testimony whereof we have signed our names to this specification in the presence of two subscribing witnesses.

ALFRED C. HARRISON.
   HERBERT M. HOWE.
   WM. W. HARRISON.

Witnesses:
 WM. A. STEEL,
 HARRY SMITH.